United States Patent [19]

Rogachevsky

[11] 4,403,581

[45] Sep. 13, 1983

[54] ROTARY VANE INTERNAL COMBUSTION ENGINE

[76] Inventor: George Rogachevsky, 8 Birchwood Ave., Spring Valley, N.Y. 10977

[21] Appl. No.: 196,262

[22] Filed: Oct. 14, 1980

Related U.S. Application Data

[63] Continuation-in-part of Ser. No. 42,993, May 29, 1979, abandoned.

[51] Int. Cl.³ ............................................. F02B 53/08
[52] U.S. Cl. .................................... 123/239; 418/138; 418/241
[58] Field of Search ....................... 123/204, 236, 239; 418/138, 241

[56] References Cited

U.S. PATENT DOCUMENTS

| | | | |
|---|---|---|---|
| 1,270,522 | 6/1918 | Jacobsen | 418/138 |
| 1,417,003 | 5/1922 | Watkins | 418/138 X |
| 3,989,011 | 11/1976 | Takahashi | 123/204 |
| 4,024,840 | 5/1977 | Christy | 418/241 X |

FOREIGN PATENT DOCUMENTS 629202  7/1927  France ............................... 123/239

*Primary Examiner*—Michael Koczo
*Attorney, Agent, or Firm*—Carl P. Steinhauser

[57] ABSTRACT

A rotary-vane internal combustion engine comprising, in combination, a rotary compressor for forming and igniting a combustible fluid mixture, a rotary power unit, and an expansion chamber that is connected both to the compressor for receiving the ignited mixture, and to the power unit, where the power developed by the expanding ignited combustible mixture in the expansion chamber drives a vane acting on a driven member.

In each of the compressor and power units respective rotors are mounted for rotation. A plurality of vanes rotatably supported by a shaft within each rotor rotates with the rotor and slide in slots in guides mounted with the rotor. The rotor within the compressor is mounted eccentrically so that the fluid is compressed before it is ignited and leaves the compressor.

The combustible fluid, after ignition, enters the expansion chamber where it drives one or more vanes coupled to the rotor mounted eccentrically within the rotary power unit. The rotor of the power unit is provided with a plurality of slotted guides receiving the vanes as they rotate through the expansion chamber. The vanes slide within the slotted guides and are maintained in constant alignment therewith by an arm coupled to each of the guides and to the rotor shaft, which is an important feature as the vanes of the power rotor leave, at some point during the operation of the engine, their respective slotted guides.

35 Claims, 14 Drawing Figures

ROTARY VANE INTERNAL COMBUSTION ENGINE

BACKGROUND OF THE INVENTION

This application is a continuation-in-part of application Ser. No. 42,993 filed May 29, 1979, now abandoned.

1. Field of the Invention

This invention relates to a rotary-vane internal combustion engine and more particularly to a novel moveable rotary-vane engine comprising, in combination, a moveable rotary-vane air compressor section and a moveable vane power section. The moveable rotor-vane assembly in the compressor section is mounted eccentrically within the compressor chamber and forms a combustible fluid mixture which is ignited before it leaves the compressor chamber and enters the power section. The power section comprises an expansion chamber which is connected to the compressor section and receives the ignited combustible fluid and allows it to expand, driving the vanes coupled to the rotor mounted within the power section. Each of the vanes of the power rotor is supported during its passage through the expansion chamber by a slotted guide which rotates with and in the power rotor, which is concentrically mounted within the power section housing. As the power rotor rotates within the power section housing, the vanes slide within their respective slotted guides, the guide slot remaining continuously aligned by guide arm of the vane assembly rotatably supported by a shaft and the guide. The power vanes at some point of operation, leave and become dissociated from their slotted guides but the guide arm serves to keep the vanes and their respective guide slots in alignment so as to permit subsequent engagement and the entry of the power vanes into their respective guide slots.

2. Discussion of the Prior Art

The rotary internal combustion engine has been recognized as more efficient than the reciprocating piston engine because it requires fewer moving parts and promises greater fuel economy than the conventional piston engine. A number of rotary engines have been described and are in use. One of these uses a triangular rotor which rotates with a two-lobed epitrochoidal chamber. This type of engine is difficult to manufacture and requires exacting chamber and rotor design parameters and the seal means are very critical. Good fuel economy and high compression rotors are also difficult to obtain, as they are with piston engines currently in use. However, the majority of those engines employ relatively complex rotor assemblies.

In contrast, the moveable rotary-vane internal combustion engines offer simplicity in design, construction, improved fuel economy, and the octane of the fuel is not critical. It is possible to achieve high compression ratios with a moveable rotary-vane combustion engine, and high horsepower to weight ratios are readily attainable.

Various vane rotor assemblies have been employed wherein the construction features range from those wherein the vanes are moveably mounted in the rotor and are in integral part of it, with each vane located in a cavity in the rotor and being inwardly and outwardly moveable therein, to those wherein, the rotor and vane assembly, as described, for example in U.S. Pat. No. 3,451,381, which discloses a rotor mounted eccentrically in a cylindrical main chamber having a rotatable shaft mounted axially in the main chamber and passing through the interior of the rotor. A plurality of vanes are mounted on the shaft and pass through the rotor to engage their outer edges in sealing relation against the internal cylindrical surface of the main chamber, thereby defining a plurality of compartments of variable volume as the rotor rotates. One of the vanes has its inner end fixedly connected to the shaft with other vanes being rotatably mounted thereon while the rotor is journalled in the chamber end plates and is thereby maintained in its eccentric position. The shaft into which the vanes are mounted serves as the power transmission means for the engine and passes through the rotor as aforesaid. It also extends sealably through bearings in the main chamber end plates. Thus this type of construction is relatively complex and presents a difficult design problem in sealing the expanding gases in the compartments formed by successive vanes as they rotate.

In order to simplify this construction it has been proposed, as described in U.S. Pat. No. 3,971,346 to mount the vanes rotatably on a floating shaft which is mounted within a hollow cylindrical rotor having vanes extending moveably inwardly and outwardly through vane apertures circumferentially distributed around a cylindrical surface of the rotor, the apertures being pivotable axially with respect to the rotor surface. Each of the vanes has a length from a floating shaft center position to a chamber-abutting vane and substantially equal to the radius of the cylindrical chamber wherein the moveable vane rotor assembly is mounted. The vanes have spring activated seal means operably connected to the vane ends and vane slides. The floating shaft is centrally oriented on a true center with respect to the axis of the chamber which assures that the vane assembly will track on a true center of the floating shaft which always centers on the true center of the curved surface of the cylindrical chamber as the rotation velocity of the moveable vane-rotor assembly increases. The centrifugal forces acting outwardly from the floating shaft, which would force the vanes against the curved surface of the cylindrical chamber were the vanes not so connected to the floating shaft, are cancelled out since the vanes are held in a centered position by the floating shaft. While this construction simplifies the design and minimizes wear due to friction, it does not achieve maximum fuel economy of which a rotary engine is capable.

It is important to note that a further distinguishing feature of the present invention over the prior art is that the power vanes located in the rotary power unit housing, at same time during the operation of the present engine, leave the slots of their associated slotted guide elements, but are kept in alignment with their respective slots by guide arms. The retention of the alignment permits the power vanes' re-engaging their respective slotted guide elements and entering the slots.

SUMMARY OF THE PRESENT INVENTION

It is an object of this invention to increase the efficiency, and thus reduce the fuel consumption, of a rotary-vane internal combustion engine.

It is another object to provide an improved rotary vane engine.

This is accomplished, in accordance with the invention, by providing a separate expansion chamber of unique design in which one or more (but less than all) driving elements or power vanes are located at any one time so that the expanding gas resulting from ignition of a combustible mixture can act on the driving elements without impeding succeeding driving elements or vane. A further preferred feature of the present invention is that the expanding ignited fuel mixture acts on an outer distal end of the power vanes located in the expansion chamber at the time. Because the combustion chamber extends over only a portion of the circular path followed by the vane there results a relatively short power stroke providing a significant increase in efficiency and power level.

The compressor has, according to a preferred embodiment of the invention, only four (4) vanes which are always located in and radially moveable with respect to their guides.

The compressor section of the engine of the present invention has an intake chamber; a compression chamber, where the ignition occurs; and intake orifice for the intake of fuel and air; and a glow plug or other ignition means. An electric motor can be used to rotate the compressor rotor.

The rotation of the compressor is provided by the electric motor and the rotor of the compressor is eccentric with respect to the compressor housing containing the compressor rotor and vanes. This configuration allows the creation of a vacuum in the intake chamber; the intake of the fuel through the intake orifice; proper compression and ignition in the compression chamber; and the delivery of the gas into the expansion chamber. The rotational velocity of the compressor regulates the intake of the fuel, i.e., the output velocity and useful power.

The rotary vane engine has no dead points, because one or more of the eight (or other number) vanes is always properly positioned in the combustion chamber, providing smooth operation.

In the present engine cylindrical covers can be located at each end of the housing and the vane shafts supported on bearings.

Each slotted vane guide features a generally rectangular cross-sectioned slot along its longitudinal axis in which its respective vane is sliding. The location of vanes and associated vane guides, which are designed to move in the same plane, always assure accurate insertion of the power vane into its guide slot upon their reengagement.

The power vanes are so configured on the shaft as to allow independent motion with respect to each other during rotation of the shaft, with the vanes converting the energy of the expanding gas into the mechanical energy of rotor rotation.

The expansion chamber can have a generally crescent-shaped cross-section form bulging out from the power housing cavity. Its curvature preferably has a smaller radius than that of the rotor and preferably is approximately equal to the power vane length. Thus, air or a combustible mixture of air and fuel is drawn into a compressor chamber in which there are a plurality of compressor vanves driven by a compressor rotor, the compressor rotor being eccentrically positioned relative to a shaft. The rotating compressor vanes compress the air or combustible air-fuel mixture. If only air is compressed, provision is made for injecting a fuel at the point just prior to maximum compression. If an air fuel mixture is used, the mixture can be ignited by a glow plug.

The ignited combustible mixture leaves the compressor and enters the expansion chamber which is connected with a power unit. The power unit includes a generally cylindrical chamber in which a rotor rotates.

A power shaft, which is eccentrically located with respect to the power chamber, rotatably supports a plurality of vanes which rotate through the expansion chamber. Thus, the shaft is concentric with the expansion chamber but eccentric with respect to the power chamber.

The rotor of the power unit is provided with a plurality of guide elements, each having a slot for receiving a vane. As the power vanes are driven through the expansion chamber by the expanding gases, they rotate and deliver power to the rotor of the power unit while at the same time rotating on, or with the shaft which rotatably supports the vanes. As the rotor of the power unit rotates, the vanes slide in the slots of the guide element which must also oscillate, or pivot, about its axis to remain aligned with the vanes. In order to maintain such alignment, each vane is supported on the shaft, at one end, by a collar, and is provided with a parallel guide spoke or arm, which is located between the rotor of the power unit. The guide arms extend at all times between the walls of a second slot in the guide element, which second slot can be in a nub on the end portion of the slotted guide element.

It sometimes desirable in order to achieve greater efficiency, to have substantially only one power vane element in the expansion chamber at one time. In order to achieve this, it has been determined that if the distance between the central axis of the shaft and the central axis of the rotor is D, the radius of the circle of the expansion chamber can be approximately 1.3 D and that of the rotor 1.8 D.

A further gain in efficiency and fuel saving can be achieved by starting and stopping the compressor unit, and regulating its speed, at the operator's discretion. Thus, if this engine is used to power a motor vehicle, while the vehicle is stopped the compressor can be easily stopped to achieve this. The compressor is independently driven, for example, by an electric motor which is operated from an independent power supply, such as a battery. In order to avoid excessive drain from the battery, an alternator may be driven from the shaft of the power unit to recharge the battery and supply power to the compressor shaft motor during operation.

Since this rotary-vane internal combustion engine can be made as a compact unit, separate units may be connected to each wheel, thus avoiding transmission devices which are also energy and fuel consuming.

The rotary vane engine of this invention has the capability of unusual efficiency, high power output ratio, versatility, economy and simplicity of design. Since the rotary-vane engine of the present invention utilizes a unique chamber design and comprises other features, it overcomes and eliminates the disadvantages and impracticalities of prior art engines by offering an equivalent of a continuous (non-reciprocating) forward motion of piston, acted upon by a constant pressure of the greater possible force component over a short stroke. This force is applied over a relatively small, nearly constant area of the vane. The energy loss and dissipation is thereby minimized due to the unique chamber design.

The present rotary-vane engine can operate using a variety of fuels such as gasoline, kerosene, and propane. Moreover, unlike the piston engine, it can work on all ignitable fuels and gases since there is no explosion.

Series of small explosions within the expansion chamber are converted into a uniform flow of an expanding gas.

The ignition system may consist only of one glow plug (which compares favorably with cumbersome piston engine ignition systems).

The ignition of the fuel can also be accomplished by the compression of the fuel and air mixture, similar to that in Diesel engines. Mixing and proportioning of the fuel of the present engine can be accomplished by the use of carburetor or a nozzle.

In the piston engine the amount of fuel intake is limited by the volume of its cylinders. The intake of the fuel in the case of rotary vane engine is unlimited. Theoretically the output power of the rotary vane engine per unit weight is also unlimited. Practically it depends on the strength of materials used in its construction, which is extremely important in an aviation field. The rotation velocity of the compressor activated by the electric motor can vary from zero to a limiting velocity of the electric motor used.

The engine output in the present invention varies proportionally to the rotational speed of the compressor i.e., to the intake of fuel per unit of time.

The invention will be described in detail hereinafter.

PREFERRED EMBODIMENTS

Figure 1A:
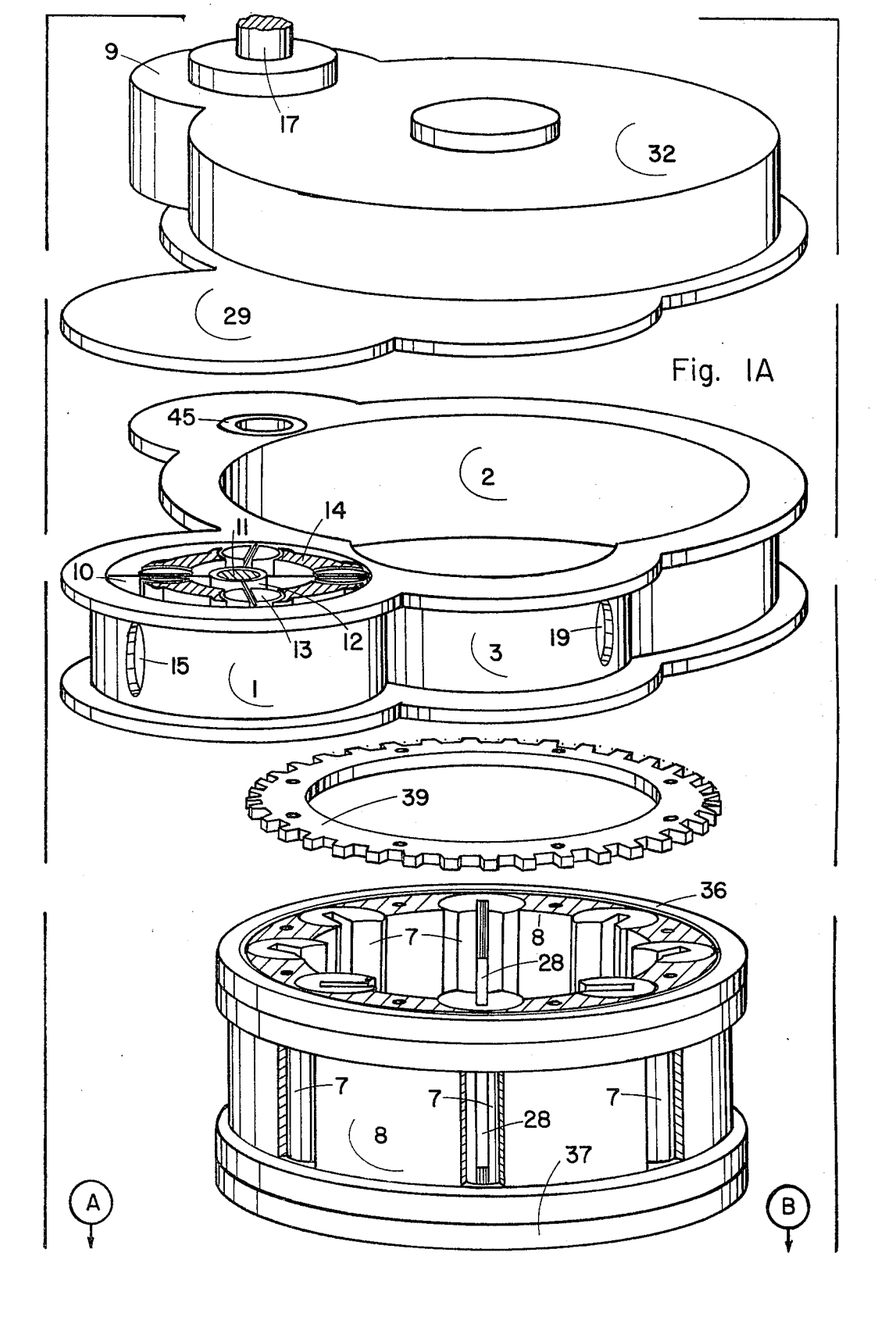
FIGS. 1a and 1b show an exploded view of the various elements of the engine assembly in relationship to one another.
Figure 1B:
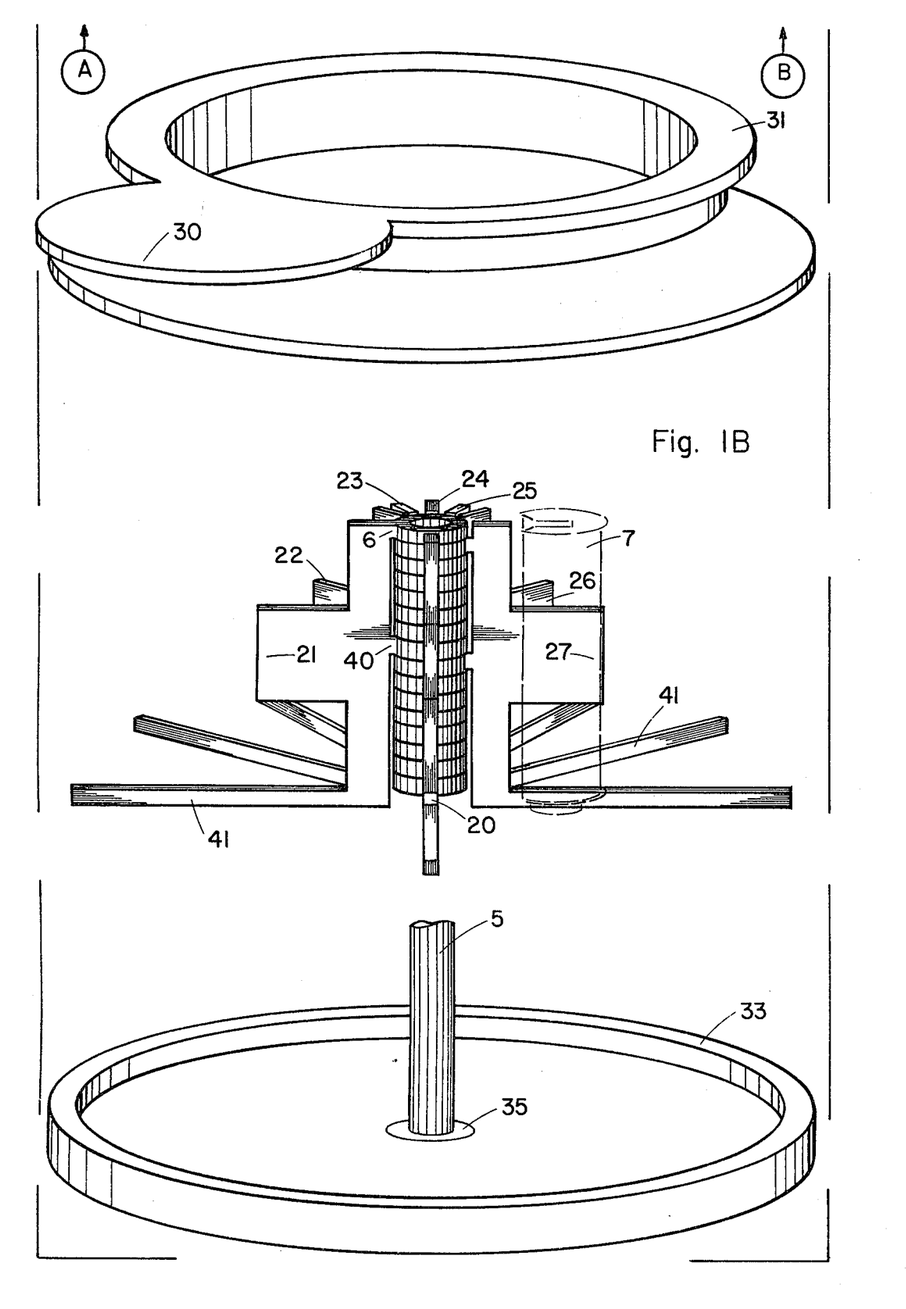

The rotary-vane engine apparatus (FIGS. 1 and 2) of the present invention comprises a compressor chamber housing 1, power chamber housing 2, and a guide arm housing 33, the power chamber housing 2 comprising a working or expansion chamber housing 3 that generally forms a protrusion in the power chamber 2. The compressor chamber housing 1, has an interior space or chamber 1a, while the working or expansion chamber housing 3 defines another interior space 3a that communicates with the interior space 1a of the compressor chamber housing 1 via fuel passageway 18 located in the wall between the compressor and working chambers, 1a and 3a, respectively.

Figure 2:
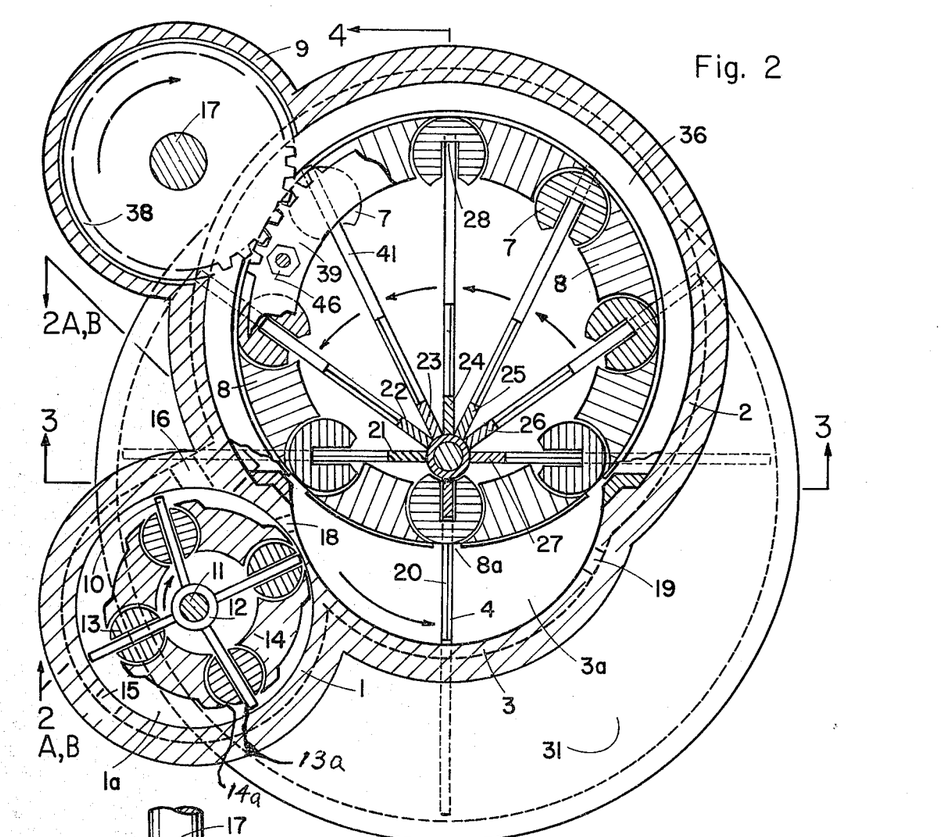
FIG. 2 is a sectional plan view of the engine assembly of FIG. 1.
Figure 2A:
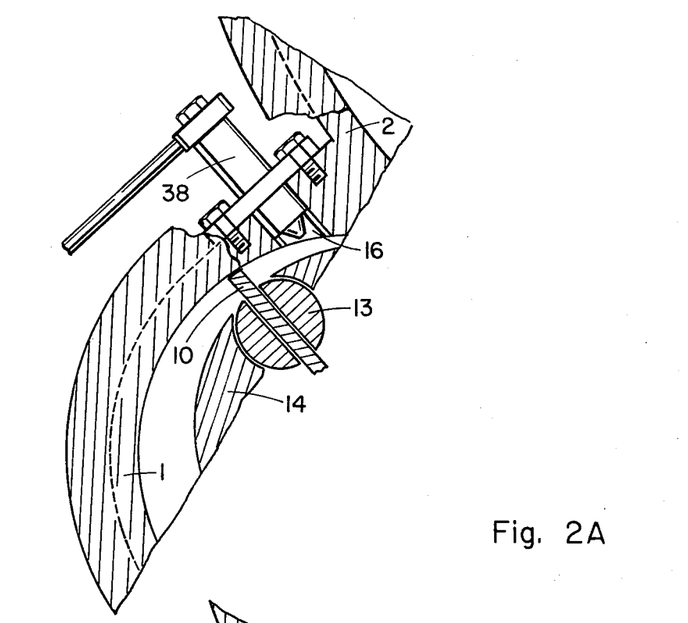
FIGS. 2a and 2b are fragmentary sectional plan views along, respectively, axes 2A—2A and 2B—2B, same showing alternatives of preferred embodiments.
Figure 2B:
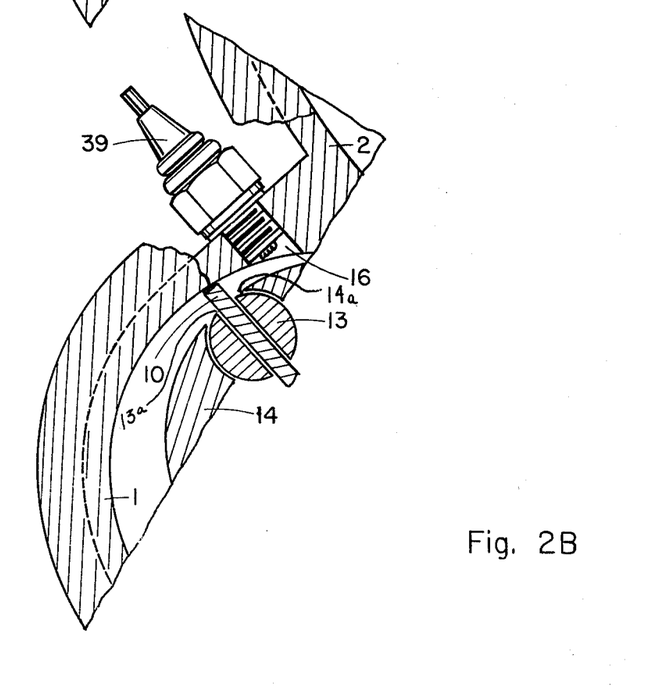

The compressor chamber housing 1 also comprises in its wall a fuel inlet port 15 (FIG. 2) via which a premixed charge is introduced into the compressor chamber 1a or by which air and fuel can be separately or simultaneously introduced into the compressor chamber 1a and mixed therein. Another entry port 16 is provided so that ignition is produced either by a fuel injector or glow plug (FIG. 2A and 2B).

There is located in the compressor chamber housing 1, a shaft 11 that is mounted so as to be generally concentric with the interior space 1a of the compressor chamber 1, the space 1a being defined, according to a preferred embodiment, by a generally cylindrical interior wall surface 1b of the compressor chamber housing 1. Also located in the compressor chamber interior space 1a is a rotor element 14 having a generally annular wall profile, with plural openings 14a therein. According to the illustrated embodiment of this invention, there are four such openings, or slots 14a, that are evenly distributed along the rotor element 14 and are of generally circular profile. There are located within each of the openings 14a, respective guide elements 13, that preferably are of cylindrical shape, each of the guide elements 13 having a slot 13a, extending diametrically therethrough. The guide elements 13 are rotatably mounted in the rotor openings 14a, the guide elements 13 being retained in the opening 14a by virtue of the arcuate shape of the opening 14a into which the guide elements 13 are fitted.

Also in the compressor chamber housing 1 are a number of compressor vane elements 10 that extend through the slots 13a of the respective guide elements 13 with which they are associated. Each compressor vane element 10 has at a first end thereof a collar or sleeve portion 12 that is rotatably supported by the shaft 11.

The compressor rotor element 14 is eccentrically located within the compressor chamber 1a so that its center is located generally between the shaft 11 and the power chamber 2. The rotor 14 of the compressor 1 is located eccentric with respect to the compressor housing 1 and to the shaft 11 of the compressor. When the rotor rotates, i.e., is driven by an external means, this eccentric configuration enables creation of a vacuum which pulls the air-fuel mixture through the intake port and compress the air-fuel mixture to the required pessure. The compressed air-fuel mixture is ignited and the ignited mixture is propelled into the expansion chamber 3a of the engine. In operation, when the compressor vanes 10 are rotated in a clockwise direction by the rotor 14, the guide element 13 and the compressor vanes 10 are driven by the rotor 14 in the same direction. Because the compressor rotor element 14 is mounted eccentrically, and the shaft 11 is concentrically located, with respect to the center of the interior space or compressor chamber 1a, the vanes 10 move, driven in rotation, with respect to the guide elements 13, so that varying amounts of the various vanes 10 extend out from their respective guide members 13, depending on the location of the vanes 10 in the compressor space 1a. Thus, from FIG. 2, it can be seen that those vanes that are, at some point in time, closer to the working or expansion chamber space 3a extend beyond their guide elements 13 by a relatively small amount, whereas those vanes 10 that are rotationally further away extend beyond their guide member 13 by a greater distance. It can also be seen that the interior wall surface of the compressor chamber housing 1, the exterior face of the rotor element 14 and each pair of adjacent vanes 10, together form various compartments between the rotor element 14 and the compressor chamber wall. These compartments vary in volume as the rotor and vanes turn in the compression chamber, with the compartments becoming smaller in volume in the vicinity of the port 16, and combustible fuel mixture being compressed in this way. As a particular vane 10 approaches the inlet port 15 the combustible mixture (either pre-mixed or post mixed) is introduced into the compartment ahead of this particular vane 10, so that after the vane 10 passes the inlet port 15, the volume of the compartment is reduced, causing the fuel to be compressed, after which the fuel is ignited and introduced into the working chamber housing 3 via opening 18.

The power unit, which as previously indicated, also includes the expansion chamber 3a, can be of generally circular profile, with the wall 3 of the expansion chamber 3a forming a generally arcuate protrusion in the wall of the power chamber housing 2. There is located in the power chamber housing 2 a second rotor element 8 that is generally annular in profile configuration, the rotor element 8 comprising plural, e.g., eight, openings 8a extending therethrough, which openings 8a are in the form of truncated cylinders.

Disposed in each of the openings 8a is a guide member 7 that is generally of cylindrical shape, the guide members 7 being seated in their respective openings 8a and being rotatably moveable therein. There should be relatively small clearances between the guide members 7 and their associated opening 8a, which preferably is true, also for the guide members 13 of the compressor chamber rotor member 14.

A shaft 5 passes through the power chamber 2a and is eccentrically disposed therein, the shaft axis being located generally between the center of the power chamber housing 2 and the working or expansion chamber 3a. The interior 3a of the expansion chamber 3 is defined by the external face of the rotor member 8 and the interior wall surface of the working chamber 3, with the fuel port 18 leading into the space 3a.

Each one of the guide members 7 of the power chamber has a slot 28 that extends diametrically therethrough, each of such slots 28 having a generally Y-shaped profile, with the arcuate mouth of the slot 28 facing the interior of the power chamber 2.

The power chamber housing 2 also comprises plural power vanes 20-27 that correspond in number with and are associated with respective ones of the guide members 7. Each vane 20-27 has at least one collar or sleeve portion 6 (FIGS. 5A and 5B) at one end thereof and is journalled on the shaft 5 via the collar portion 6. The vanes 20-27 are disposed so as to extend through the slots 28 of their respective guide elements 7 when the vanes 20-27 are in the vicinity of the expansion chamber 3 but are removed therefrom when the vanes 20-27 are more moved rotationally from the expansion chamber 3a. In any event the vanes 20-27 sweep along the interior wall surface of the expansion chamber 3. The vanes 20-27 (FIGS. 5A and 5B) each are associated with respective guide arms 41 that are spaced from the vanes 20-27 and disposed generally parallel with the vanes 20-27, with each vane 20-27 and its associated guide arm 41 being joined together by a respective connecting or linking member 41a. Preferably, each guide arm 41 has a collar 40 which fits onto the shaft 5 and is spaced from collar 6.

Each guide element 7 of the power chamber (FIGS. 3, 6A and 6B) comprises at one end thereof a slotted nub 42. The guide arm 41 associated with a particular guide element 7 extends through the slot 43 of the nub 42 at all times and the power vanes 20-27 extend through their associated guide slots 28 only part of the time. The guide arm 41 and the nubs 42 are disposed in the guide arm housing 33. The shaft 5 on which the vane structures (i.e., the vanes 20-27, guide arm 41, connecting members 41a and collars 6 and 40) are rotatably disposed, is generally concentric with the generally circular guide arm housing 33, but because the shaft 5 is eccentrically located with respect to the power rotor element 8 of the power chamber, the vanes 20-27 do not always engage their respective guide members 7 at the same area of the vanes 20-27, but instead, the vanes 20-27 move radially along and with respect to their guide members 7, as a result of which the vanes project from their associated guide member 7 by varying amounts, depending on the relative locations of the vanes 20-27 within the power chamber 2. At some time during operation, the vanes 20-27 completely leave their respective guide elements 7. It can be seen from the preferred embodiments shown in FIG. 2, that the vanes 20-27 begin to engage their associated guide members 7 as the vanes rotationally approach the expansion chamber 3a, the direction of rotation of the vanes 20-27 being opposite, in this case, to that of the vanes 10 of the compressor chamber. As the power vanes 20-27 move through the expansion chamber space 3a, in the vicinity of the area before the fuel port 18 (which preferably is located at the region of one end of the expansion chamber proximate the rotor member 8), the vane does not protrude from its guide element 7, but begins to protrude as each enters the space 3a of the expansion chamber housing 3 (at the entering end of the expansion chamber space 3a) and thereafter, protrudes more and more (as the vane sweeps along the interior wall surface of the expansion chamber 3) to a point further along the interior wall, after which the vane 20 begins to be retracted so that it extends from the guide member 7 by a lesser amount, after which the vane 20 does not extend from its guide element 7 (at the leaving end of the expansion chamber space 3a). Thereafter, the vanes are, for an interval of time, disengaged from their guide elements 7 and, subsequently, again re-engage their guide elements 7 at the guide element slot 28. The expansion chamber 3a comprises an exhaust port 19 at the leaving end thereof.

Figure 6A:
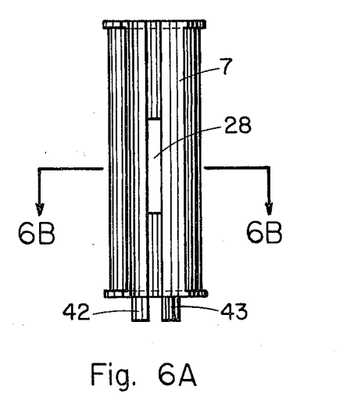
FIG. 6a is an elevational view and FIG. 6b a sectional view along the line 6B—6B of the slotted member for receiving the vane.
Figure 6B:
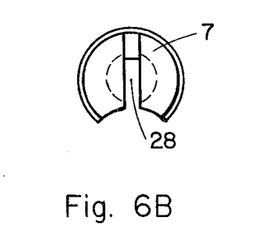

Because the guide members 7 are always engaged at their nub portion 42 by the respective guide arms 41 associated therewith and because the vanes 20-27 move in unison with their associated guide arms (the vanes 20-27 being shorter than guide arms 41), the positions of the guide members 7 are continuously being adjusted by the guide arms 41 so that the slots 28 of the guide members 7 are in position to receive their respective vanes 20-27 as the vanes approach the expansion chamber 3a. To achieve this, the guide arms 41 are slidably disposed within the nub slots 43 of their associated nubs 42, so that the guide elements 7 are rotationally adjusted to be in a position to receive their associated vanes 20-27. It can be seen that the guide elements 7 have an oscillating motion and do not make complete turns in the opening 8a in the rotor 8, which is also the case for the compressor guide elements 13 of the compressor chamber 1a. The nubs 42 of the guide member 7 preferably are coaxial therewith, as shown in FIGS. 6A and 6B.

The motion of the power rotor 8 of the power chamber 2 is effected by the action of vanes 20-27 upon it. At certain instants during the operation cycle there can be, for example, either one vane or two vanes (when one such vane is just entering and the other vane is leaving the expansion chamber) that are positioned in the expansion chamber 3a.

The vanes 20-27 of the power chamber are propelled by the expansion of burning gas (fuel-air mixture), which is delivered from compression chamber 1a into the expansion chamber 3a through the opening 18.

The vanes 20-27 are closely fitted into the closely fitting cavity shaped slots 28 of their respective guide members 7. During the operating cycle of the engine, the operating part of the vane moves through the slot 28 in the vane guide 7. The guiding arm or spoke 41 of each vane fits through another slot (end slot) 43 of its associated vane guide nub 42. The guiding part or arm 41 of the vane remains in constant contact with the vane guide nub 42 during the entire cycle of operation. Both slots, i.e., guide slot 28 and the slot 43 of nub 42, are in the same plane and aligned, which assures exact insertion (meshing) of operating part of the vanes 20-27 with guide slots 28.

The electrical system of the rotary vane engine can be similar to that of a conventional piston type engine; i.e., generator (or alternator), electric motor and storage battery. There are no other electrical devices, such as distributors or other timing devices.

Lubrication and cooling systems are also similar to those of a conventional piston engine.

Supply of fuel can be accomplished either through a carburetor or through fuel injection.

The expansion chamber wall or means 3 preferably is of an arcuate configuration and forms an arc of an imaginary circle of smaller diameter than that of the main portion of the power chamber housing 2, with the centers of the power chamber 2a and expansion chamber 3a being spaced apart. The size of the compressor chamber 1a generally can be whatever is satisfactory. According to a preferred embodiment of the present invention, the distance between the central axis of the power chamber shaft 5 and the central axis of the rotor 8 is a certain value, D, while the radius, $R_1$, of the expansion chamber 3 is equal to about 1.3 D and the radius $R_2$, of the rotor 8 is equal to about 1.8 D. These ratios, though not absolutely essential, can be used in several instances.

It is especially preferred that the expansion chamber wall be of an arcuate profile and that the arc extend over a distance such that it subtends an angle, as measured at the center of the power chamber 2 (see FIGS. 8 and 9), of less than 100 degrees, e.g. about 90 degrees or less. It is preferred that this angle of the sector defined by the arcuate expansion chamber wall with the center of the power chamber, be small and more preferably, as small as possible so as to provide an expansion chamber wall surface that has a small or even minimal surface area. Hence, such arcuate sectors preferably have central angles of small value, e.g., 30 degrees or less, more preferably 20 degrees or less, and even 10 degrees or less. Therefore, it is desirable that such angles be, for example 5 degrees or where possible, 3 or less degrees, with an angle of about 1 degree being possible. By causing the central angle of the imaginary sector provided by the arcuate expansion chamber wall, to be a small value, gains can be attained in the power output of the engine of the present invention. It is desirable, also, that the arcuate wall 3 of the expansion chamber 3a be relatively flat or at least that the extent by which the arcuate wall 3 protrudes be small, this to minimize the volume of the expansion chamber 3a, so as to obtain a higher power output. It is generally desirable that the volume of the expansion chamber 3a be relatively small, or even as small as possible, for increased power output.

Thus, after the fuel-air mixture has been compressed, it is ignited by a glow plug 39 (FIG. 2B) and leaves compressor chamber 1a via outlet port 18 and enters the space 3a of expansion chamber 3 where it expands, driving a vane 20 in the chamber. Alternatively, air only is drawn into the compressor chamber 1a, liquid fuel can be injected via a fuel injector 38 (FIG. 2A) just prior to the point of maximum compression at which point a combustible mixture is formed which ignites and leaves through port 18 driving one of the vanes 20 as the ignited mixture expands. After expanding, i.e. after vane 20 is about to leave space 3a of expansion chamber 3, another vane 21 enters driving the spent gases through exhaust port 19.

An important feature of this invention is that where desired, the power rotor-vane arrangement can be designed so that only one vane is in the expansion chamber and located between ports 18 and 19 at any time thus allowing the entering gases to fully expand and expend their forces against rear surface of the vane 20. This will be apparent from FIG. 2 where only a single vane 20 is in the expansion chamber 3a. As this vane moves in a forward, or counter-clockwise direction, it will reach the exhaust port 19, sweeping all gases before it out through the exhaust port, before or at about the time that another vane 21 reaches the outlet port 18 of compressor 1. Thus, as each successive vane 20-27 enters the expansion chamber 3a, the previous vane will be leaving, the gaseous mixture in the chamber, its force expended or reduced by expansion thereof, will be driven out through the exhaust port 19, and a fresh ignited fuel charge introduced through port 18 will begin expanding and driving vane 21 or successive vanes 22, 23, 24, 25, 26, and 27, as the case may be.

At this point, it should be observed that the compressor can be driven by means independent of the rotor 8 to achieve independent control. To that end the compressor can be driven by an electric motor (not shown) which is connected to a battery. If desired, the battery can be recharged by an alternator driven by the rotor 8. Thus, when the operator desires to conserve fuel, as when a motor vehicle is stopped, the compressor can be stopped by turning off the electric motor, and restarting the same when power is required. Likewise, speed control can be achieved by controlling the speed of the electric motor.

Figure 3:
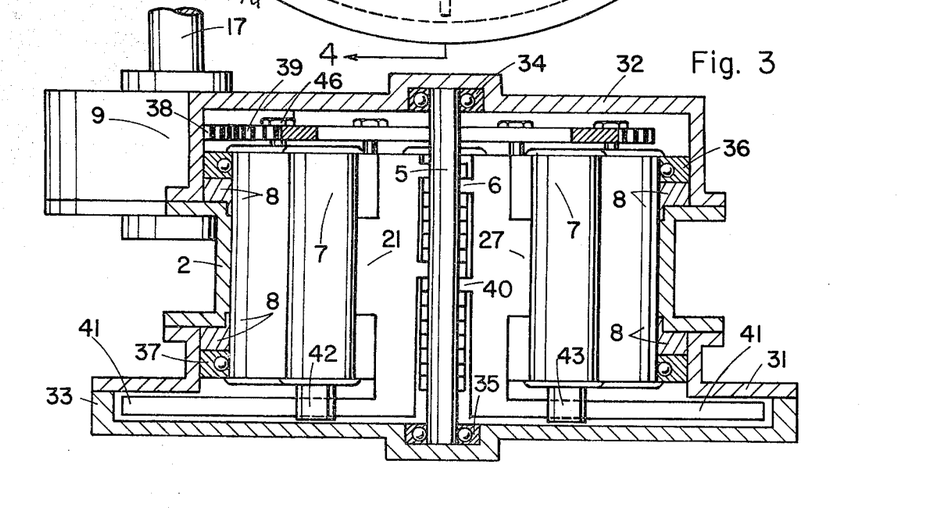
FIG. 3 is a sectional elevational view along the lines 3—3 of FIG. 2.
Figure 4:
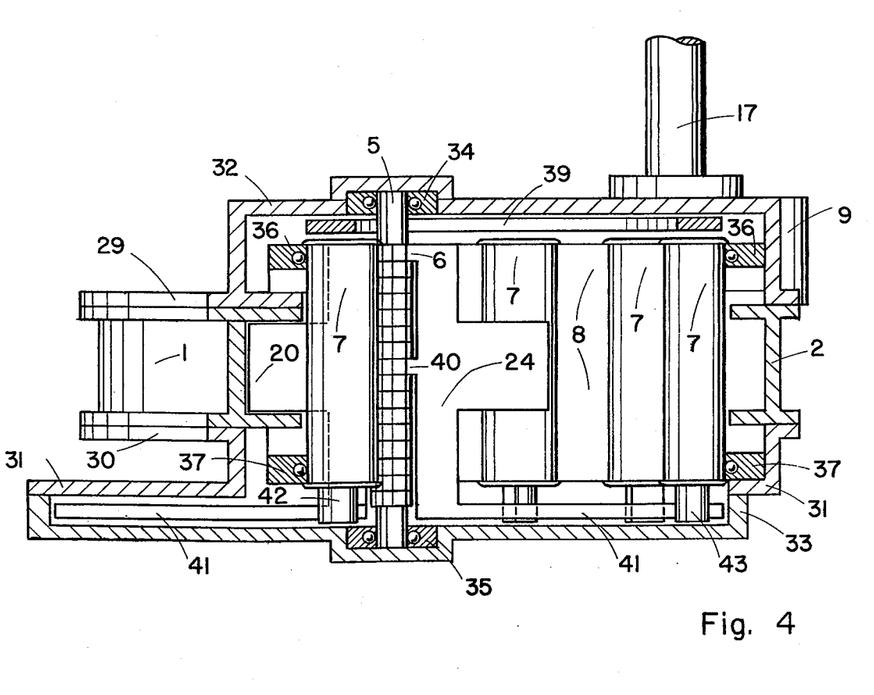
FIG. 4 is a sectional view along the lines 4—4 of FIG. 2.

Compressor chamber 1 is closed by covers 29 and 30 (FIGS. 1A and 1B), the latter forming part of a lower cylindrical housing 31 for the power rotor assembly, and the expansion chamber and power rotor assembly are closed by both cover 32, through which shaft 5 extends and is journalled in bearings 34, and cover 33, in which shaft 5 is journalled in bearing 35 (FIG. 3). The rotor assembly is rotatably supported within the power chamber housing 2 by bearings 36 and 37.

Figure 5A:
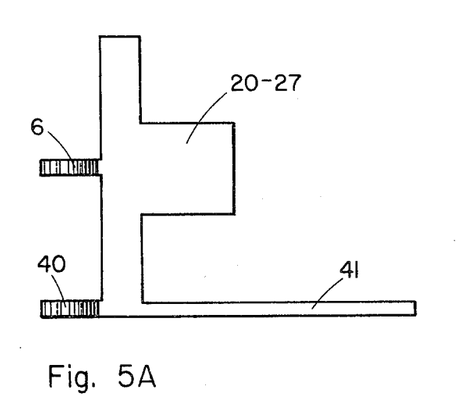
FIG. 5a is an elevational view and FIG. 5b a plan view of a vane element.
Figure 5B:
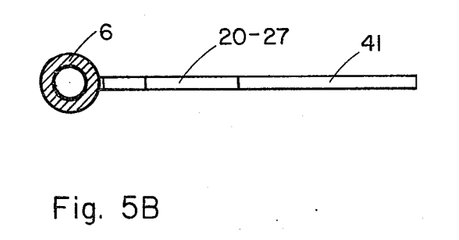
Figure 7:
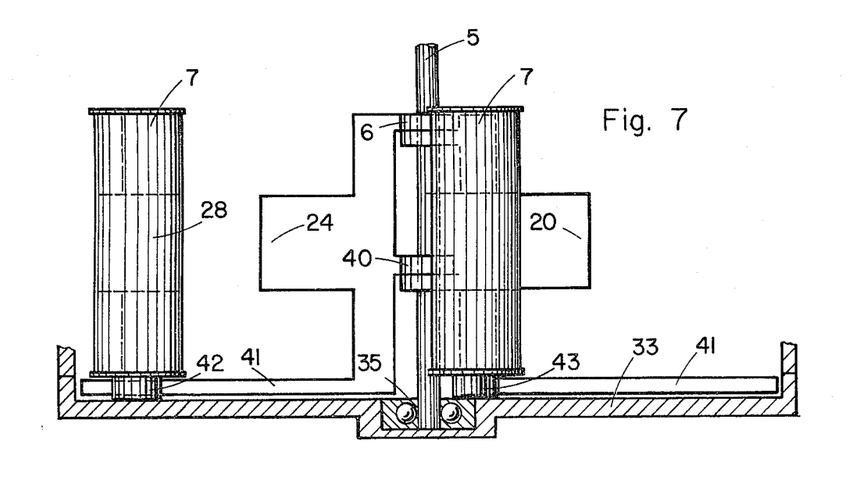
FIG. 7 is an elevational view of a vane positioned on a slotted member.

Each vane 20-27 as shown in FIG. 5a, has an upper sleeve 6 in which the shaft 5 is journalled as well as a lower sleeve 40 in which the shaft is also journalled. Each of the lower sleeves 40 has a guide arm 41 which extends between extensions forming the slot 43 of the nub 42 (see FIG. 6a) which ensures that as the power rotor assembly, which includes rotor 8 and vanes 20-27 as well as the vane guides 7, rotates, the guide element 7 will be ready to receive its vane so that the vane and guide element 7 engage one another again, which is shown in FIG. 7 and FIG. 2 where valve 20 is in the expansion chamber 3a and extends through slot 28 in its vane guide element 7 whereas vane 24 and its vane guide (FIG. 2) are separated but the vane guide slot 28 is aligned with the vane 24 and engages the nub 42 of the vane guide element.

While the guide members 7 of the power chamber 2 are uniformly spaced along the rotor 8, the guide arms 41 (and the vanes 20–27, as well) are not equidistant from each other (as seen from FIG. 2), due to the eccentricity of the shaft 5 and the center of the rotor 8.

As the vane 20 and successive vanes 21–27, are driven counter-clockwise by the expanding gases in expansion chamber 3a, they drive the rotor 8 which transmits the power via gear teeth 39 to a gear 38 which drives via drive shaft 17 a driven member (not shown) such as a wheel or pulley.

The rotory vane engine has, further, no dead points. The intake of fuel into the combustion chamber can be regulated as needed and the output power does not depend on the speed of the power rotor. All these represent a great advantage since there is no need for clutch or transmission.

The lubrication and cooling systems and materials used in the rotary vane engine construction can be similar to the existing piston engine systems.

Where it is desired, there can be connected in tandem several power sections that individually comprise a power chamber housing containing a power rotor and vanes and an expansion chamber, similar to that shown in FIG. 2. In such an arrangement, the ignited fuel, after being expelled from one expansion chamber, can be transmitted to the next power section, where the combusted fuel (which has already driven the power vanes of a preceding power section) does further work by acting upon and driving the power vanes of this next power section, and so forth in other subsequent power sections. In this way, a given volume of combusted fuel can do work in several power sections, thereby deriving a greater work output per unit of fuel.

Some advantages of the rotary vane engine can be summarized as follows:
1. Output power-unit weight ratio of the rotary vane engine is expected to be 3-4 times (and possibly more) higher than that of an existing internal combustion engine.
2. Output power is independent of velocity of driven unit
3. Simplicity of construction
4. Dynamically balanced construction
5. Can work on any ignitable fuel
6. Many applications
7. Absence of dead points i.e., smoothness of operation
8. Easy starting of the engine
9. Engine construction allows the use of pollution control devices without affecting the power output
10. Allows the use of non-polluting fuels such as hydrogen.

In the rotary vane engine the rotor of the engine and the vanes are independently balanced. By design, the vane which does the work is always located in the most effective position. The vanes are supported by the bearings. Sliding parts are designed in such a way as to minimize friction.

In addition the rotary vane engine can be effectively used as a steam engine, or pneumatic engine and the construction of a compressor allows it to be used effectively in place of any existing compressor.

Figure 8:
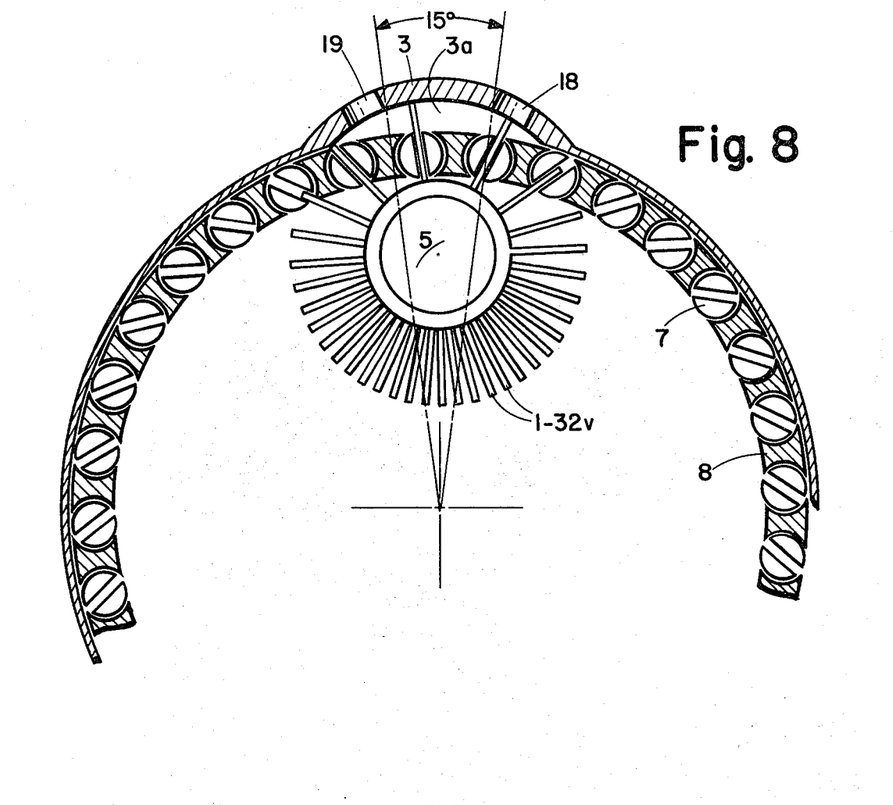
FIG. 8 is a fragmentary plan view of a power rotor-power vane arrangement according to another embodiment of the invention.
Figure 9:
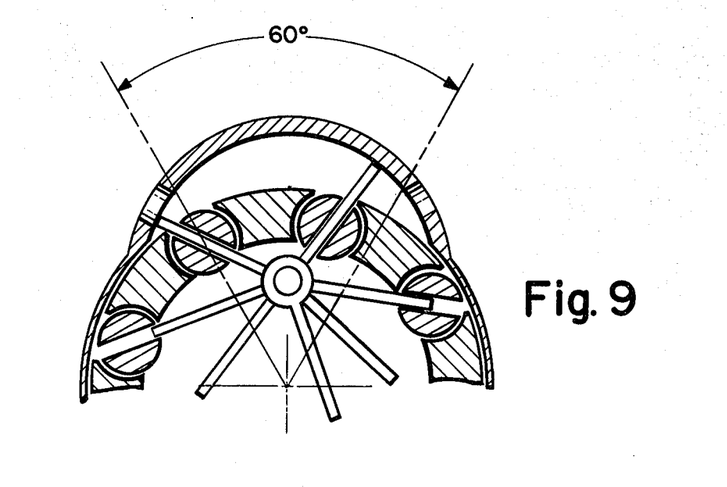
FIG. 9 is a diagrammatic representation of the expansion chamber, showing various geometric relationships.

The number of power vanes of the present invention can vary, a large number of vanes, as shown in FIG. 8, where previously assigned numerals are used to designate similar or comparable elements. The arrangement shown in FIG. 8 illustrates how maximum efficiency of the engine can be reached, considerably more than in the arrangement shown in FIG. 2, not only by the large number of vanes, but a rather flat expansion chamber and a smaller angle, 15°, as opposed to 60° (FIG. 9). The same reference numerals refer to the same parts.

While the invention has been described with reference to specific and preferred embodiment, other variations will be apparent to those skilled in this art without departing from the spirit and scope of the invention as defined in the appended claims.

What is claimed is:

1. A rotary-vane internal combustion engine comprising:
   a. A compressor unit having a chamber for forming, compressing, and igniting a combustible fluid mixture and comprising:
      1. a first rotor mounted eccentrically within the compressor chamber,
      2. a plurality of compressor vanes mounted for rotation with said first rotor, and
      3. means for igniting the compressed combustible mixture to form a working fluid,
   b. A power unit having a chamber comprising
      1. a power shaft disposed within the power chamber,
      2. a second rotor mounted within said power chamber and eccentrically disposed with respect to said second shaft.
      3. a plurality of radially disposed power vanes having one end thereof pivoted on said power shaft,
      4. a plurality of slotted vane guide elements disposed in said second rotor for receiving respective ones of said power vanes in the said slots during only a part of the operating cycle of said engine, said power vanes being adapted to be withdrawn from the slots of their respective guide elements during other parts of said operating cycle,
      5. Guide arm means connected to respective ones of said power vanes, said guide arm means continuously engaging respective ones of said vane guide elements, whereby said guide elements are adjusted to maintain their slots and their associated power vanes in alignment, and
      6. An expansion chamber connected to the compressor unit for receiving the ignited combustible fluid and forming an extension of said power chamber, said power vanes extending into and forming a sealing relationship with said expansion chamber and forming variable volume working chambers for the expansion of the working fluid.

2. A rotary-vane internal combustion engine as in claim 1, in which said power chamber means is cylindrical and the expansion chamber means has an arcuate profile configuration lying on a circle whose center is spaced from the center of the power chamber means.

3. A rotary-vane internal combustion engine as in claim 2 in which the compressor chamber has a circular profile configuration.

4. A rotary-vane internal combustion engine as claimed in claim 2 in which each of said power vanes of the power chamber is associated with one of said guide arms to form a unitary structure.

5. A rotary-vane internal combustion engine as in claim 4 in which each of said unitary structures comprises at least one collar member and a linking element, said linking element joining said vane and its respective guide arm, said collar member being disposed at a first side of said linking member, and said vane and guide arm being disposed on the opposite side thereof.

6. A rotary-vane internal combustion engine as in claim 5 in which said guide arm and its associated power vane are substantially parallel to one another.

7. A rotary-vane internal combustion engine as in claim 6 in which the guide arm extends beyond its associated said power vane.

8. A rotary-vane internal combustion engine as in claim 1, wherein said power shaft is concentrically disposed with respect to said expansion chamber and eccentrically with respect to said power chamber.

9. A rotary-vane internal combustion engine as in claim 1 in which the second rotor has a generally annular configuration.

10. A rotary-vane internal combustion engine as in claim 9 in which said second rotor comprises a wall element defining an interior space, said second rotor further comprising openings in said wall element spaced apart along the periphery thereof, and extending through the entire thickness of said wall element.

11. A rotary-vane internal combustion engine as claimed in claim 10 in which said openings have respective axes that are substantially parallel to the central axis of the second rotor.

12. A rotary-vane internal combustion engine as in claim 11 wherein said guide members are rotatably disposed at respective ones of said openings.

13. A rotary-vane internal combustion engine as in claim 12 in which each of said guide members comprises a slot extending diametrically therethrough.

14. A rotary-vane internal combustion engine as in claim 13 in which said guide member slots have a generally Y-shaped cross-section configuration.

15. A rotary-vane internal combustion engine as in claim 14 in which said guide member slots each has an arcuate mouth portion disposed at the periphery of their respective guide membes, said power chamber vanes at times extending through their respective guide vane slots.

16. A rotary-vane internal combustion engine as in claim 1 in which said power shaft is disposed between the central axis of said power chamber and said expansion chamber.

17. A rotary-vane internal combustion engine as in claim 1 in which the distance between the central axis of said shaft and the central axis of said second rotor is D, the radius of the circle of said expansion chamber R is approximately equal to 1.3 D, and the radius of the power chamber $R_2$ is approximately equal to 1.8 D.

18. A rotary-vane internal combustion engine as in claim 1, further comprising a circular guide chamber means coaxially disposed with said power shaft and communicating with said power chamber and wherein said guide arms travel within a track defined by said guide chamber means.

19. A rotary-vane internal combustion engine as in claim 18, wherein each of said guide elements further comprises a coaxially disposed nub projection extending from an end of said guide element into said guide chamber, said nub projection having a slot for receiving each of said guide arms.

20. A rotary-vane internal combustion engine as in claim 1, in which the compressor chamber is generally cylindrical in shape.

21. A rotary-vane internal combustion engine as in claim 20 in which the compressor rotor has a generally annular configuration.

22. A rotary-vane internal combustion engine as in claim 21 in which said compressor rotor comprises a wall element defining an interior space, said compressor rotor further comprising openings in said wall element spaced apart along the periphery thereof, and extending through the entire thickness of said wall element.

23. A rotary-vane internal combustion engine as in claim 22 in which said openings have respective axes that are substantially parallel to the central axis of the compressor rotor.

24. A rotary-vane internal combustion engine as in claim 23 in which said compressor rotor comprises a plurality of guide members disposed in each of said openings.

25. A rotary-vane internal combustion engine as in claim 24 in which each of said guide members has a slot extending diametrically therethrough.

26. A rotary-vane internal combustion engine as in claim 22, in which said compressor vanes are connected to a shaft which is concentric with said compressor chamber.

27. A rotary-vane internal combustion engine as in claim 26 in which the compressor rotor is positioned eccentrically with respect to the shaft and the compressor chamber.

28. A rotary-vane internal combustion engine as in claim 1 in which the ignition means is a glow plug.

29. A rotary-vane internal combustion engine as in claim 1 or 28 in which the combustible fluid mixture is a mixture of a combustible fluid and air.

30. A rotary-vane internal combustion engine as in claim 28 in which the compressor chamber has an inlet port for the combustible fluid mixture.

31. A rotary-vane internal combustion engine as in claim 1 including fuel injection means at the region between the compressor chamber and the expansion chamber.

32. A rotary-vane internal combustion engine as in claim 2, wherein said expansion chamber has a sector-like configuration.

33. A rotary-vane internal combustion engine as in claim 32, wherein the arc of said expansion chamber extends over an angle, as measured at said power shaft of about 60° or less.

34. A rotary-vane internal combustion engine as in claim 33, wherein said angle is about 15° or less.

35. In an internal combustion engine having a compressor for compressing a combustible fluid, an expansion chamber connected to said compressor for receiving the compressed combustible fuel, a cylindrical power chamber connected to said expansion chamber, and means to ignite the combustible fluid and forming a working fluid upon leaving the compressor, the improvement wherein the expansion chamber is a sector of a circle whose center is spaced from the center of the power chamber, the length of said sector subtending an angle of less than about 60° measured at the center of said power chamber, said power chamber housing a power unit comprising a rotor, a plurality of power vanes disposed circumferentially about said rotor rotatably supported by a shaft eccentrically positioned therewithin, a plurality of slotted vane guide elements in said rotor for receiving respective ones of said power vanes in said slots during only a portion of the rotation of the rotor and being withdrawn during the remainder of the rotation of the rotor, and guide arm means connected to each of the respective vanes and engaging the vane guide elements whereby the guide elements are adjusted to maintain the slots and vanes in alignment, said vanes being adapted to disengage from said guide elements at points more remote from said expansion chamber, and to engage and project beyond said guide elements into and in sealing relationship with said expansion chamber forming variable volume working chambers for the expansion of the working fluid whereby the vanes in the expansion chamber are driven by the expanding ignited fluid.

* * * * *